July 7, 1970 P. PATIN 3,518,944
STEPLESSLY VARIABLE-SPEED CONVEYOR
Filed Nov. 12, 1968 3 Sheets-Sheet 1

INVENTOR
PIERRE PATIN
By Young + Thompson
ATTYS.

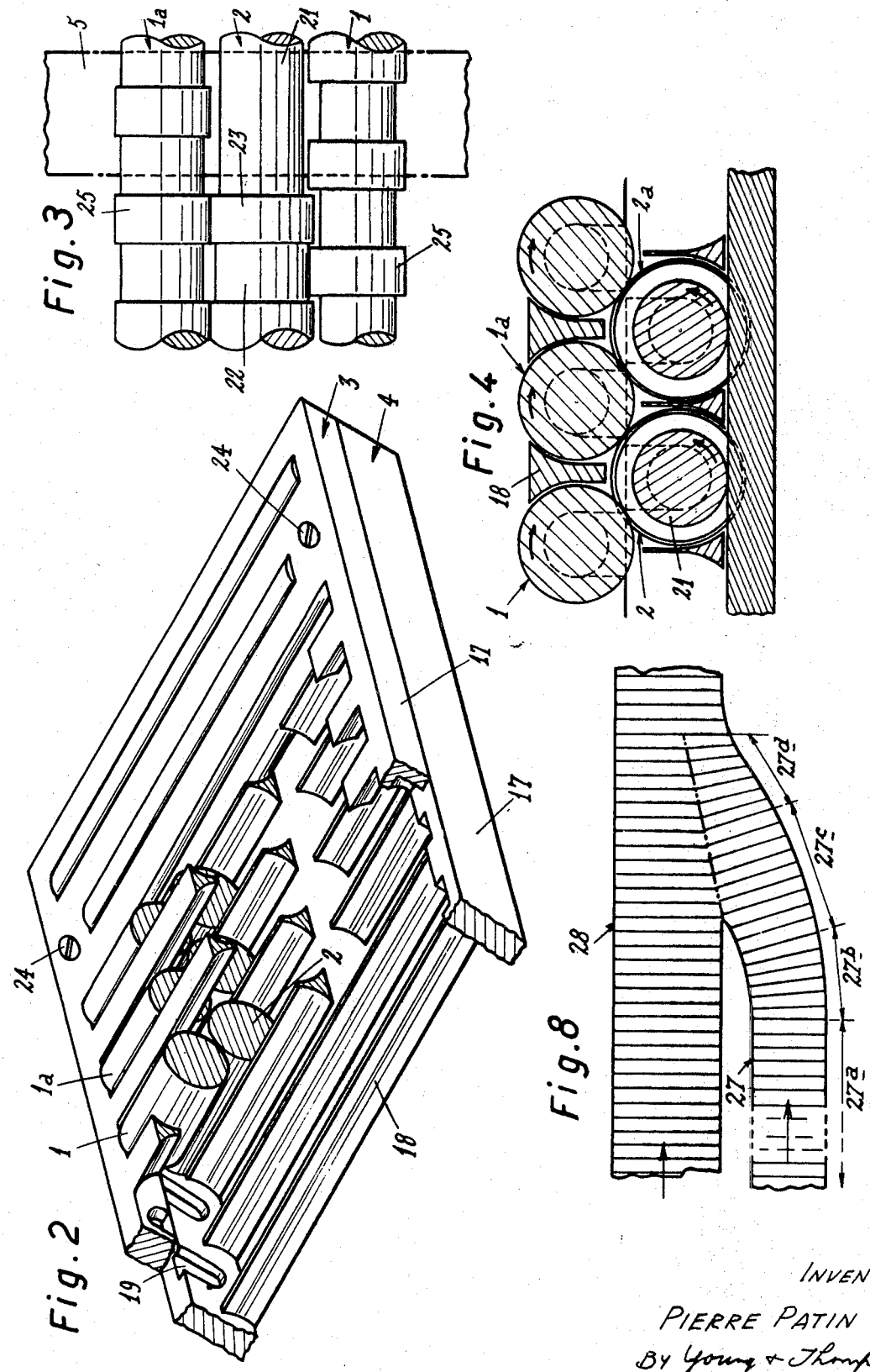

July 7, 1970 P. PATIN 3,518,944
STEPLESSLY VARIABLE-SPEED CONVEYOR
Filed Nov. 12, 1968 3 Sheets-Sheet 3
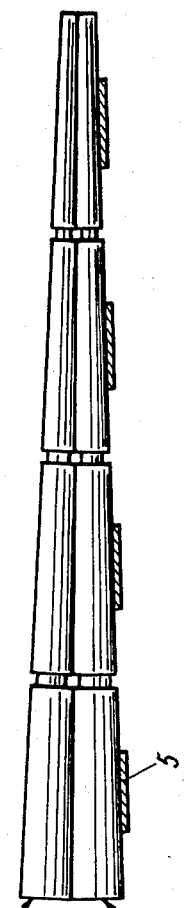
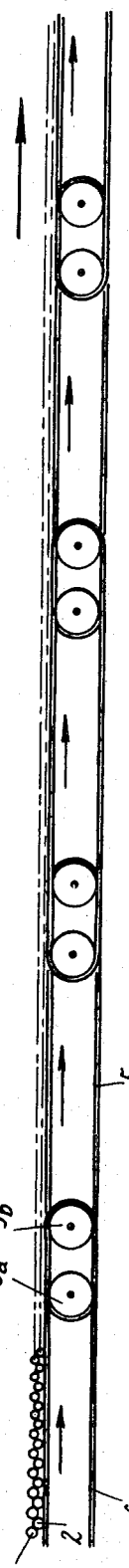
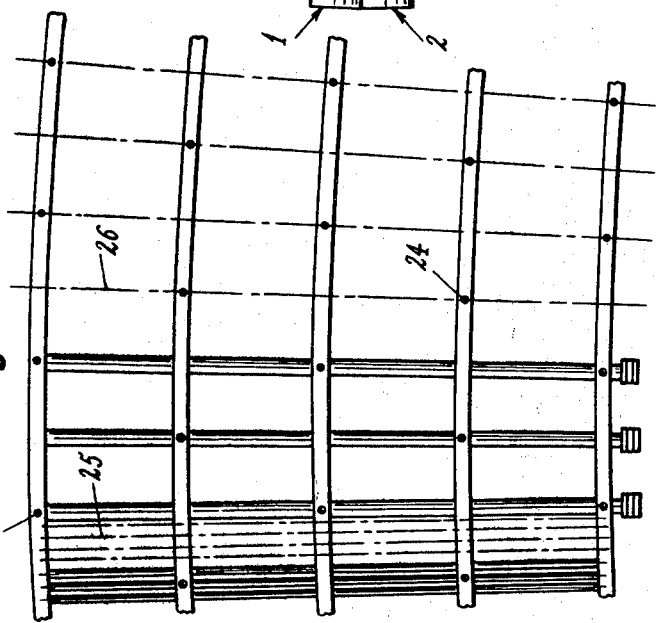
INVENTOR
PIERRE PATIN
BY Young + Thompson
ATTYS.

2,518,944
Patented July 7, 1970

3,518,944
STEPLESSLY VARIABLE-SPEED CONVEYOR
Pierre Patin, 58 Rue de Sevres, Boulogne-sur-Seine,
Hauts-de-Seine, France
Filed Nov. 12, 1968, Ser. No. 775,036
Claims priority, application France, Nov. 20, 1967,
128,807
Int. Cl. B65g 13/02
U.S. Cl. 104—25                                                 8 Claims

ABSTRACT OF THE DISCLOSURE

The invention concerns a roller conveyor, particularly for passengers, comprising bearing rollers arranged in a top row in the gaps of a grating from which they project slightly. These bearing rollers are friction-driven by drive rollers disposed in a bottom row and rotated at progressively variable speed from any roller to the next. The conveyor is mainly characterized in that each roller of a row is in contact with two rollers of the other row, the drive rollers have sections whose diameter varies from any roller to the next and which are in contact with a number of moving endless belts and in that the bearing rollers have sections which are in contact with sections of the drive rollers, whose diameters are such that the bearing rollers run at peripheral speeds varying substantially steplessly from any roller to the next.

---

This invention relates to a roller conveyor of use for moving primarily passengers and secondarily packages so that the same experience a substantially stepless speed variation, more particularly at the start and end of the journey.

Roller conveyors for packets are known in which the speed can be varied stepwise, whereas passenger conveyors are of the endless belt kind and usually run at a constant speed.

It is an object of this invention to provide roller conveyors which can pick up passengers at pedestrian speed, then move them at a speed which progressively increases up to a definitely higher value, or conversely, without any risk of them falling or of their footwear or clothing being caught or jammed.

The invention provides a roller conveyor, more particularly for passengers, of the kind comprising bearing rollers arranged in a top row parallel to the axis of conveyor advance, the bearing rollers being disposed in the gaps of a grating from which they project slightly, the bearing rollers being friction-driven by drive rollers disposed in a bottom row, the conveyor also comprising means for rotating the drive rollers at speed progressively variable from any roller to the next, characterized in that each roller of a row is in contact with two rollers of the other row; the drive rollers have sections whose diameter is variable from any roller to the next and which are in contact with a number of moving endless belts parallel to the axis of conveyor advance; and the bearing rollers have sections which are in contact with sections of the drive rollers whose diameters are such that the bearing rollers run at peripheral speeds varying substantially steplessly from any roller to the next.

Consequently, the speed at which the loads move varies substantially steplessly along the conveyor; also, the overlapping of the bearing and drive rollers prevents them from sagging.

Preferably, the bearing-roller sections which contact the drive rollers are all of the same diameter; and each drive roller has two sections in contact one with the preceding bearing roller and the other with the following bearing roller, the diameter of each such section being proportional to the speed of the bearing roller with which such section is in contact.

The load-bearing surface is therefore flat and there is no risk of any roller slipping relatively to the other.

Advantageously, the conveyor comprises a number of compartments which are consecutive in the direction of the axis of conveyor advance; and the drive belts of each compartment are connected to a facility imparting to them a linear speed of displacement varying stepwise from any compartment to the next.

The speed of load movement over very long conveyor lengths can therefore be varied, yet the diametric variation of the roller contact sections does not exceed reasonable limits.

Advantageously, those compartments of the conveyor which are on curves have slightly conical rollers, and the driving belts in such compartments on curves are driven by shafts whose axes are at an inclination to one another.

Other featrres of the invention will emerge from the following description.

An embodiment of the invention is shown in the accompanying exemplary non-limitative drawings wherein:

FIG. 2 is a perspective view of part of the conveyor showing the mounting of the rollers in their gratings;

FIG. 3 is a plan view of the rollers;

FIG. 4 is a cross-sectional view of the rollers;

FIG. 5 is a diagram showing a conveyor compartment on a curve;

FIG. 6 is a diagram showing the support arrangement in a compartment on a curve;

FIG. 7 is an elevation view showing the rollers in a compartment on a curve; and FIG. 8 is a diagram showing lateral access to a conveyor.

Figure 1:
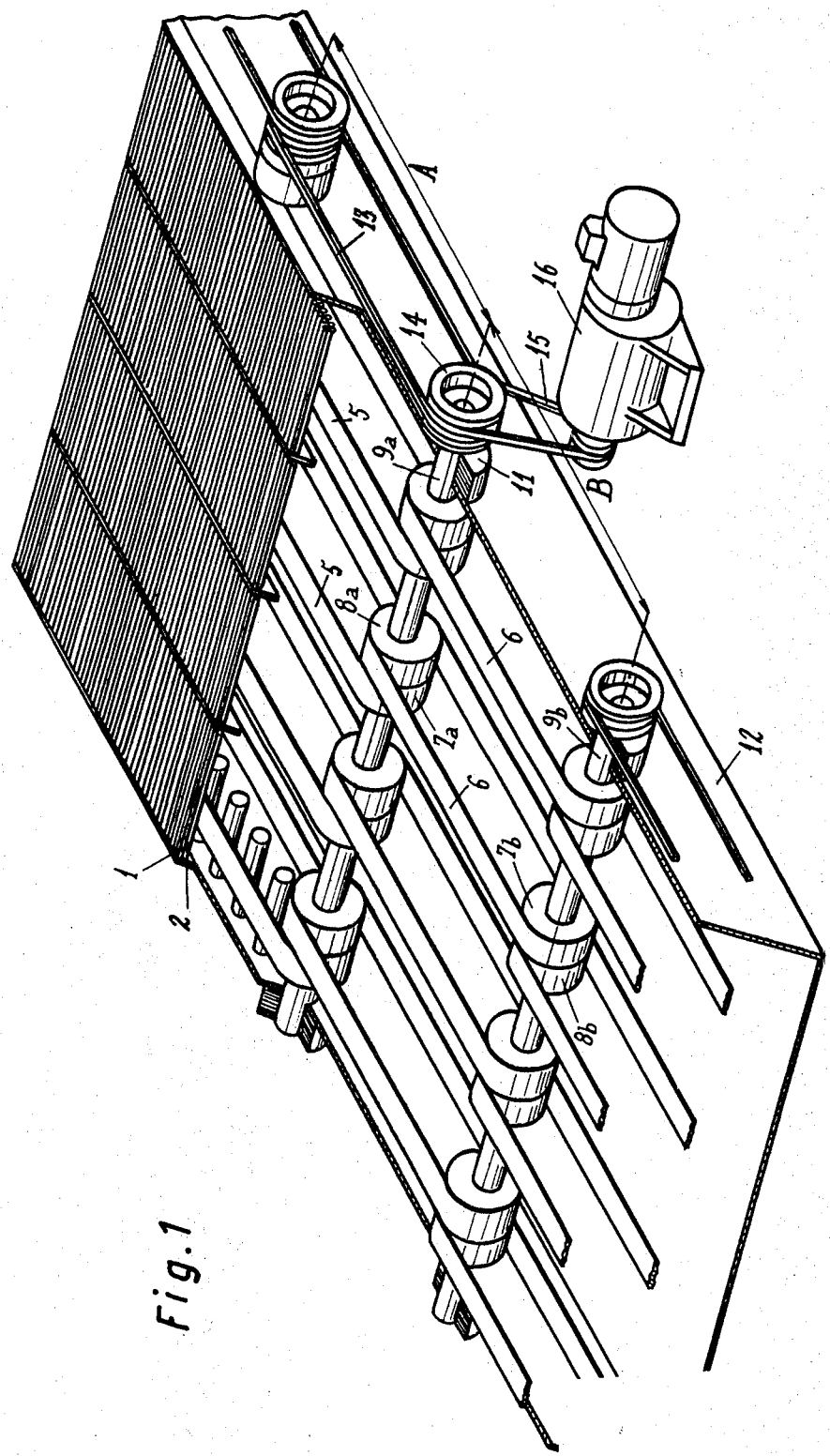
FIG. 1 is a perspective view of a conveyor according to the invention with some parts broken away.

Referring to FIGS. 1 and 2, a conveyor comprising a number of similar spans—four in the drawings—which are parallel to the axis of advance. Each span comprises a row of bearing rollers 1 rotated by a row of drive rollers 2, the rollers 1, 2 being so mounted in gratings 3, 4 as to rotate around their own axes. The drive rollers 2 are rotated by belts 5, 6 running over drums 7a, 8a, 7b, 8b mounted on shafts 9a, 9b. The conveyor comprises consecutive compartments, as A, B. Each shaft, as 9a, bears drive drums 7a for the belts 5 of compartment A and supporting drums 8a overlapping with the drive drums 7a for the belts 6 of the immediately previous compartment B. The drive drums 7 rotate solidly with the shafts 9, but the supporting drums 8 are freely rotatable relatively to the shafts 9 and may therefore run at a different speed from the drums 7. The shafts 9 are mounted in bearings 11 of a frame 12 and are interconnected by belts 13 running over pulleys 14 rigidly secured to shafts 9. One of the shafts 9 is also connected by a belt 15 to an, e.g., electric motor 16. The diameters of the pulleys 14 are stepped so that consecutive shafts 9 run at different speeds and the belts 5, 6, etc., of consecutive compartmnets move at different speeds V, V+v, etc. The system formed by the shafts 9 thus interconnected and the motor 16 form a division of the conveyor. Of course, a number of divisions can be juxtaposed in the manner visible in FIG. 1.

FIG. 2 shows how the various rollers 2, 1, 1a are disposed in the gratings 3, 4. The same are of similar construction and are arranged symmetrically of a horizontal plane. Each grating 3 or 4 comprises longitudinal members 17 interconnected by cross-members 18 which in cross-section resemble curvilinear triangles. Members 17 are formed on their inside surfaces with recesses 19 in which the journals of the rollers 1, 2 engage. The recesses 19 are so distributed between the cross-members 18 that the bearing surface formed by the rollers 1 and top surfaces of the cross-members 18 is substantially flat and continuous. The gratings 3, 4 are so disposed that the bearing rollers 1 are disposed in staggered relationship between the drive rollers 2. Screws 24 interconnect the two gratings 3, 4.

Referring to FIG. 3, the drive rollers 2 have a section 21 which is in contact with the belts 5, 6 and which is frictionally driven thereby. The diameter of section 21 varies substantially steplessly from any roller to the next, being, e.g., 9.40 mm. in the case of one roller, 9.37 mm. for the next roller and 9.34 mm. for the next roller. The rollers 2 also have two sections 22, 23 whose diameters are 10.97 and 11 mm. respectively and which contact the preceding bearing roller 1 and the following bearing roller 1a. Roller distribution is the same for all compartments.

The bearing rollers 1 have sections 25 of larger diameter which contact the drive rollers 2 and which are all of the same diameter, e.g., 10 mm., but which are offset along the roller axis between the roller 1 and the next roller 1a so that portion 25 of roller 1 contacts portion 22 of drive roller 2 whereas portion 25 of the next bearing roller 1a contacts portion 23 of the same drive roller 2. The diameters of the sections 22, 23 are proportional to the peripheral velocities required for the bearing rollers 1, 1a, and so there is no relative slip between the rollers 1, 2, 1a.

The drums 7, 8 over which the belts 5, 6 run have diameters such that, taking into account the variable diameters of the contact sections 21 of the drive rollers 2, the bearing surface formed by the bearing rollers 1 and the cross-members 18 is substantially horizontal.

The conveyor operates as follows:

Via belts 13, 15, motor 16 drives the consecutive pulleys 14 of different diameters. The consecutive shafts 9a, 9b are rotated at different speeds such that the drive drums 7a, 7b rotating solidly with the shafts 9a, 9b transmit stepped linear velocities to the belts 5, 6 associated with consecutive compartments of the conveyor. For instance, the belts 5 of compartment A run at a speed V of, e.g., 600 mm./sec., the belts 6 of the immediately previous compartment B run at a speed $V-v$, and the belts of the compartment following the compartment A run at a speed $V+v$, and so on. The belts 5 rotate the drive rollers 2 of compartment A at speeds which increase substantially steplessly from any roller to the next. In the case of the first roller 2 of compartment A, the peripheral velocity of the section 22 is, e.g., 700 mm./sec., and the velocity of the portion 23 is 702 mm./sec. The bearing roller 1 therefore has a peripheral velocity of 700 mm./sec., and the next bearing roller 1a has a velocity of 702 mm./sec. The next drive roller 2a (FIG. 4) of compartment A is rotated faster than roller 2 so that the peripheral velocity of its section 22 is again 702 mm./sec. There is therefore no slip between roller 1a and roller 2a. Section 23 of roller 2a runs at 704 mm./sec., and this speed is transmitted to the next bearing roller. Clearly, the consecutive bearing rollers of any single compartment have speeds which increase from any roller to the next by 2 mm./sec. i.e., speed variation is substantially stepless.

The last bearing roller of compartment A has a peripheral velocity equal to the peripheral velocity of the first roller of such compartment pulse the value $v$. The next roller is the first bearing roller of the next compartment, and it runs at almost the same speed since in this compartment belt speed is increased by $v$.

The speed at which passengers move therefore varies from walking pace to a definitely higher level, the variation being substantially stepless.

Also, because of the small roller diameter and of the shape of the cross-pieces 18 disposed between the bearing rollers 1, the bearing surface is substantially flat and continuous. Slender objects such as stiletto heels cannot get caught between the rollers, thus ensuring passenger safety and comfort.

Also, the way in which the bearing rollers 1 are driven—the same are disposed in known manner in the recesses in the grating 3—differs from the conventional way wherein a pair of small-diameter bearing rollers are driven by a single relatively large-diameter drive roller which is in turn driven by a mechanical drive facility.

Very flexible operation is ensured by the belt drive for the drive rollers 2.

The fact that the drive rollers 2 bear on a number of belts 5, 6 and that the bearing rollers 1 bear on and overlap drive rollers 2, obviates any risk of the loading causing these small-diameter rollers to sag and ensures that the bearing surface stays completely flat.

It is very easy to disassemble the gratings and rollers; all that needs to be done is to remove the screws 24 to separate the two gratings, then disengage the roller journals from the recesses 19.

Referring to FIG. 5, on curves the roller axes 25 and the drive shaft axes 26 are convergent and not parallel and, as can be seen in FIG. 7, the bearing rollers 1 and drive rollers 2 are slightly conical. As FIG. 6 shows, the belt-driving shafts 9 are replaced by two shafts, the shaft 9a of compartment A being placed upstream of the shaft 9b of the preceding compartment B so that the drive is continuous. On every shaft 9 the drive drums on the inside of the curve have a smaller diameter than the outer drums so that the rollers are all driven at the same angular velocities.

As FIG. 8 shows, the conveyor according to the invention can be used as a lateral access channel 27 to a main conveyor 28 which can be either a constant-speed or a variable-speed conveyor. The lateral conveyor 27 picks up passengers at walking speed and gradually accelerates them to the main conveyor speed V. The lateral conveyor 27 comprises a straight portion 27a, in which the passengers are accelerated up to the speed V, followed by constant-speed parts. The same comprise two curved portions 27b, 27d separated by another straight portion 27c. The axes of the rollers of the portions 27b, 27d converge at places disposed on both sides of the conveyor 28.

Similar action can be taken to provide two convergent accesses at the entry of the conveyor and two divergent exits at the end of the conveyor.

The invention is not of course limited to the embodiment hereinbefore described and constructional variants are possible without departure from the scope of the invention.

What is claimed is:

1. A roller conveyor, more particularly for passengers, of the kind comprising bearing rollers arranged in a top row parallel to the axis of conveyor advance, the bearing rollers being disposed in the gaps of a grating from which they project slightly, the bearing rollers being friction-driven by drive rollers disposed in a bottom row, the conveyor also comprising means for rotating the drive rollers at speeds progressively variable from any roller to the next, characterized in that each roller (1, 2) of a row is in contact with two rollers (1, 1a, 2, 2a) of the other row; the drive rollers (2) have sections (21) whose diameter is variable from any roller to the next and which are in contact with a number of moving endless belts (5, 6) parallel to the axis of conveyor advance; and the bearing rollers (1) have sections (25) which are in contact with sections (22, 23) of the drive rollers (2) whose diameter are such that the bearing rollers (1) run at peripheral speeds varying substantially steplessly from any roller disposed axially to the next.

2. A conveyor as set forth in claim 1, characterized in that the bearing-roller sections (25) which contact the drive rollers (2) are all of the same diameter; and each drive roller (2) has two sections (22, 23) in contact one with the preceding bearing roller (1) and the other with the following bearing roller (1a), the diameter of each such section (22, 23) being proportional to the speed of the bearing roller (1, 1a) with which such section (22, 23) is in contact.

3. A conveyor as set forth in claim 1, characterized in that it comprises a number of similar spans parallel to the axis of advance and each having a number of belts (5, 6) for rotating the drive rollers (2).

4. A conveyor as set forth in claim 1, characterized in that it comprises a number of compartments (A, B) which are consecutive in the direction of the axis of conveyor advance; and the drive belts (5, 6) of each compartment (A, B) are connected to a facility (7, 9, 14, 15, 16) imparting to them a linear speed of displacement varying stepwise from any compartment to the next.

5. A conveyor as set forth in claim 4, characterized in that the difference between the speeds of displacement of the belts (5, 6) associated with two consecutive compartments (A, B) is substantially equal to the difference between the peripheral velocities of two end bearing rollers of a single compartment.

6. A conveyor as set forth in claim 4, characterized in that the belt drive facility comprises for each compartment (A) parallel shafts (9a) and a facility (14) for rotating each such shaft at a different speed; and each shaft (9a) bears, rotating solidly with it, a number of drive drums (7a) which drive the belts (5) of the corresponding compartment (A), and a number of supporting drums (8a) which overlap with the drive drums (7a) and which are mounted to rotate relatively to the shaft (9a) to bear the belts (6) of the previous compartment (B).

7. A conveyor as set forth in claim 1, characterized in that it has slightly conical rollers (1, 2) in its curved parts; and the axes (25) of such rollers converge towards the centre of the curve.

8. A conveyor as set forth in claim 1, characterized in that the belt drive facility has in the curved portions of the conveyor drive shafts whose axes (26) are inclined relatively to one another; the drive shafts (9a) of the downstream compartment are disposed upstream of the drive shafts (9b) of the upstream compartment; and the drive drums (7) of the spans on the inside of the curve are of smaller diameter than the drums of the spans near the outside of the curve.

References Cited

UNITED STATES PATENTS

| | | | |
|---|---|---|---|
| 2,756,686 | 7/1956 | Kendall et al. | 104—20 XR |
| 3,176,828 | 4/1965 | Sullivan | 198—127 |
| 3,189,161 | 6/1965 | Schneider et al. | 198—182 XR |

ALBERT T. MAKAY, Primary Examiner

U.S. Cl. X.R.

198—76, 127